United States Patent Office 3,321,525
Patented May 23, 1967

3,321,525
CO-OXIDATION OF THIOLS AND ACETYLENIC COMPOUNDS
Karl Griesbaum, Elizabeth, and Alexis A. Oswald, Westfield, N.J., assignors to Esso Research and Engineering Company, a corporation of Delaware
No Drawing. Filed Jan. 31, 1963, Ser. No. 255,165
10 Claims. (Cl. 260—590)

This invention relates to a novel oxidation process and products obtainable therefrom. More particularly the invention relates to the selective oxidation of the triple bond of acetylenic compounds by oxygen or air in the presence of thiols to yield novel hydroperoxide intermediates useful in the synthesis of polymers, keto-, hydroxy- and amino-acids. By further processing in accordance with this invention, valuable glyoxal hemithoacetal intermediate and dicarbonyl compounds are obtainable.

Certain glyoxals and glyoxal hemithioacetals have been known in the art. Glyoxals have been prepared, for example, by oxidation of substituted methyl ketones, such as acetophenone, in the presence of an oxidant such as selenium dioxide. The glyoxal hemithioacetals may be subsequently prepared by a reaction between the oxidatively produced glyoxal and an alkyl, aryl or heterocyclic mercaptan. The above-described processes are relatively expensive due to the nature of the starting materials and the oxidizing agent employed.

It is one object of this invention to provide a novel process for preparing glyoxal hemithioacetals in good yields in a single step.

It is another object of this invention to provide a novel process for the preparation of dicarbonyl compounds, such as glyoxals, in good yields.

Yet another object of this invention is to provide a novel process for producing novel hydroperoxide compounds having utility as intermediates in the synthesis of polymers and organic acids.

These and other objects are accomplished by the co-oxidation of an acetylenic compound having the general formula R—C≡C—R' with a mercaptan having the general formula R"SH at low temperatures for a time sufficient to obtain substantial conversion to the desired end products. While not wishing to be bound by any particular theory it is believed that one possible mechanism for the reaction of the above-described materials is as follows:

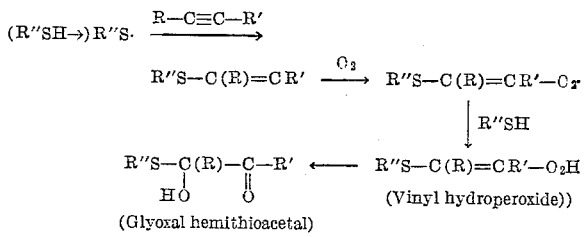

(Glyoxal hemithioacetal)   (Vinyl hydroperoxide))

It is believed that the chain is started by the addition of a mercapto radical to one carbon atom of an acetylenic triple bond to form a highly reactive vinylic radical. In the enusing co-oxidation reaction the vinylic radical intermediate combines with molecular oxygen to form the vinyl hydroperoxy radical. The vinyl hydroperoxy radical then may abstract a hydrogen from the thiol to yield a vinylic hydroperoxide. This vinylic hydroperoxide is unstable except at very low temperatures and may spontaneously rearrange to form the glyoxal hemithioacetal end product. It is emphasized that the above description is only representative of one possible explanation of the reaction mechanism and is offered only for the purposes of better understanding the novel process of the invention. It is possible that the final products obtained from the process of this invention may be the result of other mechanisms and rearrangements which may occur to the skilled in the art.

The glyoxal hemithioacetals obtained from the above reaction may be readily converted to the corresponding dicarbonyl compounds and thiols by utilizing heat and conventional distillation techniques. Hence the stable phenylglyoxal hemithioacetal, for example, is a potentially valuable source for monomeric phenyl glyoxal which ordinarily may not be stored as a monomer due to its tendency to polymerize. A continuous process for preparing the dicarbonyl compounds may be described by the following equations:

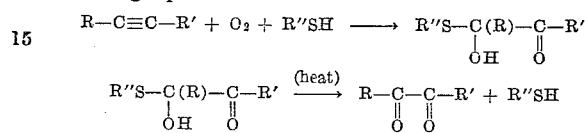

It is evident that the thiol obtained from the decomposition described in the second reaction may be recycled for utilization in the co-oxidation of the acetylenic starting material.

As previously described in this specification, the acetylenic compound utilized as starting materials in the co-oxidation process have the general formula:

$$R—C≡C—R'$$

where R and R' may be the same or different and may be any of the following:

R=hydrogen
or R=$C_1$–$C_{35}$ alkyl group, e.g., methyl, ethyl, butyl
or R=$C_6$–$C_{20}$ aryl group, e.g. phenyl, naphthyl, phenanthryl
or R=$C_7$–$C_{50}$ alkylaryl group, e.g. tolyl, mesityl, dimethylnaphthyl, nonylphenyl, butylnaphthyl
or R=$C_1$–$C_{35}$ substituted alkyl group, e.g. chloropropyl, nitroamyl, hydroxymethyl, carboxymethyl
or R=$C_6$–$C_{50}$ substituted aryl or alkylaryl group, e.g. bromonaphthyl, nitrotolyl, chloronoylphenyl Particularly preferred starting materials are monosubstituted acetylenic compounds where either R or R' is hydrogen and the other constituent is selected from the groups recited above. Furthermore, although any of the above-named materials will operate in the process of this invention, it is especially preferred that R or R' or both be a $C_{10}$ group or lower since it is well known to those skilled in the art that the speed of addition reactions is dependent to a large extent on the molecular weight of the reactants.

The thiol which is utilized as the other starting material in the reaction has the general formula:

$$R"SH$$

where

R"=hydrogen
or R"=$C_1$–$C_{35}$ alkyl group, e.g., methyl, n-propyl, n-hexadecyl
or R"=$C_4$–$C_{20}$ heterocyclic group, e.g. benzothiazyl, pyridyl
or R"=$C_6$–$C_{20}$ aryl group, e.g. phenyl, naphthyl, phenanthryl
or R"=$C_7$–$C_{50}$ alkylaryl group, e.g. nonylphenyl, xylyl
or R"=$C_1$–$C_{35}$ substituted alkyl group, e.g. aminoethyl, hydroxyethyl, mercaptoethyl, carboxyethyl, etc.
or R"=$C_6$–$C_{50}$ substituted aryl or alkylaryl gorup, e.g. chlorophenyl, nitrotolyl
or R"=acyl group, e.g. acetyl Particularly preferred thiols are those compounds wherein R is a $C_{10}$ group or lower since it is well known that higher molecular weights tend to slow down addition reactions.

The hydroperoxides, glyoxal hemithioacetals and dicarbonyl compounds obtainable by carrying out the novel process of this invention and previously described in this specification will have structures dependent upon the selection of the particular acetylenic compound and thiol since R, R' and R'' have a uniform definition throughout this specification. Typical hydroperoxides produced by this invention are those in which R, R' and R'' are selected from groups consisting of 1 to 10 carbon atoms, for example, 1-phenyl-2-phenylmercapto-1-hydroperoxy-ethylene; 1-phenyl-2-butylmercapto-1-hydroperoxy - ethylene; etc.

The oxygen employed in the process is preferably pure oxygen (99.6% purity) although the reaction may be carried out by bubbling air, or $O_2$ enriched air, through the reaction mixture, if so desired.

The reaction is preferably carried out in the presence of an inert solvent although it is not essential to the process. Suitable inert solvents are $C_1$-$C_{32}$ aliphatic hydrocarbons such as pentane and heptane, aromatic hydrocarbons such as benzene, chlorinated hydrocarbons such as chlorobenzene, and alcohols such as methanol.

The temperature employed in the co-oxidation reaction is critical since the novel hydroperoxide intermediates produced by the reaction are unstable and do not form except at low temperatures. In general, temperatures from −100° C. to +50° C. may be employed in the reaction. The yield of product is favored, however, by lower temperatures and temperatures in the range of −100° C. to 0° C. are preferred. If the desired end product is a hydroperoxide it is essential that the temperature of the reaction be held below 0° C. The formation of hemithioacetals is favored by carrying out the reaction in the preferred ranges discussed above and then allowing the reaction mixture to stand at temperatures above −10° C.

The length of the reaction is not critical and may vary within wide limits depending upon the choice of reactants. Optimum reaction time may vary from 5 to 10 minutes to 3 or more days. In some instances it may be desirable to use ultraviolet light to initiate the reaction and reduce the reaction time. However, the use of ultraviolet light is not essential and may be omitted if desired.

In a preferred method of reaction a desired amount of an acetylenic compound is admitted to an open flask equipped with Dry Ice-propanol cooled Dewar condenser and a dropping funnel. Oxygen is introduced through a bubbler and leaves the condenser through a bubbler and the thiol is added to the reaction system at a rate measured by the rate of oxygen absorption. The reaction mixture is continuously stirred and the reaction is continued for a time in excess of the time needed to absorb the theoretical amount of oxygen as calculated by the molecular amounts of materials utilized and the measured rate of oxygen absorption.

As previously mentioned, the co-oxidation product will spontaneously rearrange at temperatures above −10° C. to yield glyoxal hemithioacetal. These hemithioacetals may be decomposed by the application of heat to yield valuable dicarbonyl compounds. Temperatures in the range of +20 to 300° C. and preferably 50 to 200° C. are utilized in this decomposition. The temperatures employed may vary over wide limits depending upon the initial choice of reactants. The thiol and dicarbonyl compound obtained from the decomposition may be separated by conventional techniques, such as distillation, and the thiol recycled to the co-oxidation reaction.

The invention may be further described by reference to the following examples.

*Example 1*

A solution of 7.7 g. (0.075 mole) of phenylacetylene in 640 ml. of n-pentane was purged with oxygen at −75°. The reaction flask was then connected to a 2000 ml. gas burette filled with oxygen. Dropwise addition of 8.2 g. (0.07 mole) of benzenethiol to the stirred solution was started. After an induction period of about 5 minutes, a rapid absorption of oxygen began. From that time the rate of thiol addition was adjusted from time to time to the rate of oxygen absorption. At the start of the oxygen absorption, the solution turned yellow and within a few minutes a solid precipitate began to form. The thiol addition was completed in an hour. The reaction mixture was stirred for an additional 20 minutes in the oxygen atmosphere until the theoretical amount of oxygen was absorbed. Then the oxygen was removed from the mixture by bubbling nitrogen into it.

Half of the mixture was filtered and dried cold to yield 7 g. (76.5%) of a slightly yellow unstable solid which melts at about −8°. This solid was immediately analyzed for hydroperoxide content by its oxidation of iodide and thiols. A positive reaction with these materials is known to distinguish hydroperoxides from dialkylperoxides. There was a positive identification of 1-phenyl-2-phenylmercapto-1-hydroperoxy - ethylene. On standing for 24 hrs. at −10°, just below its initial melting point, the primary product lost its peroxide content. It no longer melted below room temperature. The product was compared with phenylglyoxal phenyl hemithioacetal obtained by direct synthesis from benzenethiol and phenylglyoxal as taught by Kipnis and Ornfelt, J. Am. Chem. Soc. 74, 1068 (1952). The infrared spectra were identical and the mixed melting points showed no depression.

The other half of the reaction mixture was kept under nitrogen atmosphere and allowed to come to −10° and kept there for two days. During this period an apparent rearrangement of the primary product occurred. The solid did not melt on coming to room temperature. It could be filtered at room temperature by suction to yield 5.5 g. (60%) of the hemithioacetal.

*Example 2*

An ice-water cooled solution of 7.7 g. (0.07 mole) of phenylacetylene in 600 ml. of n-heptane reacted with 8.2 g. (0.075 mole) of benzenethiol in an oxygen atmosphere in a manner described in Example 1. After one minute the originally colorless solution became hazy and turned yellow. The thiophenol was added within 30 minutes. During this time, the rate of oxygen absorption was between 50 and 80 ml./minute and the temperature of the mixture rose from 3° to 10°. After all of the thiol had been added, the oxygen uptake ceased within 10 minutes and the temperature dropped to 6°. The total volume of oxygen absorbed was 1710 ml. (calculated for standard conditions) or 102% of the theoretical amount required. The heptane was removed from the reaction mixture by vacuum distillation. The remaining semisolid material yielded 4.3 g. (23.5%) of the crystalline hemithioacetal.

*Example 3*

A mixture of 10.2 g. (0.1 mole) of phenylacetylene and 900 ml. of pentane in a 1-liter quartz flask was purged with oxygen for 1 minute at −70°. Then 5.3 g. (0.11 mole) of methanethiol was added at once and the oxygen flow was adjusted as in Examples 1 and 2. The mixture was irradiated with a 100 w. high pressure Hanovia U.V. lamp. The temperature was kept below −60°. The mixture became slightly yellow soon after the start of the reaction. The solid reaction product began to precipitate after one hour. After a conversion of 70% was reached in 20 hours, the mixture was worked up. The slightly yellow solid was filtered to yield 11 g. (86%) of phenylglyoxal methyl hemithioacetal, M.P. 99–101°.

*Example 4*

The co-oxidation reaction of methanethiol and phenylacetylene was carried out as in Example 3 with the exception that the temperature was maintained at 0° C. Phenylglyoxal methylhemithioacetal was obtained in a 36% yield.

Example 5

The co-oxidation of ethanethiol and phenylacetylene was carried out as in Example 3. The temperature was maintained at 0° C. A 43% yield of phenylglyoxal ethylhemithioacetal was obtained.

Example 6

Butanethiol and phenylacetylene were co-oxidized according to the procedure in Example 3. A reaction time of 3½ days was utilized. The corresponding hemithioacetal was isolated in a 34% yield.

Example 7

Phenylglyoxal methylhemithioacetal (18.2 g.; 0.1 mole) was placed in a 50 ml. distillation flask, equipped with a small distillation head, a fraction collector and a cooled (−80°) trap. The compound was heated until it melted (~100° C.). Then a vacuum of 0.5 mm. was applied to the whole distillation system. The methanethiol was recovered from the cold trap (4.1 g.; 85%) whereas the receiver contained 11.6 g. (87%) of monomemic phenylglyoxal, B.P. 60–70%/0.5 mm. The compound has been identified by comparison of its infrared and NMR spectrum with those of an authentic compound.

Having thus described the general nature and specific embodiments of the present invention, the true scope is now pointed out by the appended claims.

What is claimed is:

1. A selective oxidation process which comprises bubbling oxygen through a mixture of an acetylenic compound having the formula R—C≡C—R' where R is hydrogen and R' is selected from the group consisting of $C_1$ to $C_{10}$ alkyls, aryls, and alkylaryls and a thiol having the formula R"SH where R" is selected from the group consisting of $C_1$ to $C_{10}$ alkyls, aryls, and alkylaryls at a temperature in the range of −100° to +50° C. for a time sufficient to yield a glyoxal hemimercaptal having the formula

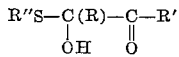

2. The process of claim 1 wherein said glyoxal hemimercaptal is heated at a temperature in the range of 20° C. to 300° C. for a time sufficient to yield a dicarbonyl compound having the formula

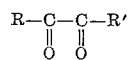

3. A selective oxidation process which comprises bubbling oxygen through a mixture of phenyl acetylene and a thiol having the formula R"SH wherein R" is selected from the group consisting of $C_1$ to $C_{10}$ alkyls, aryls, and alkylaryls at a temperature in the range of −100° to 0° C. for a time sufficient to yield a phenyl glyoxal hemithioacetal having the formula

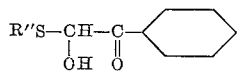

4. A selective oxidation process which comprises bubbling oxygen through a mixture of phenyl acetylene and a thiol having the formula R"SH wherein R" is selected from the group consisting of $C_1$ to $C_{10}$ alkyls, aryls, and alkylaryls at a temperature below −10° C. until the theoretical amount of oxygen is reacted to yield a vinylic hydroperoxide having the formula

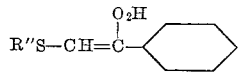

5. The process of claim 3 wherein said thiol is benzenethiol.

6. The process of claim 3 wherein said thiol is methanethiol.

7. The process of claim 3 wherein said thiol is ethanethiol.

8. The process of claim 3 wherein said thiol is butanethiol.

9. The process of claim 3 wherein said phenylglyoxal hemithioacetal is heated at a temperature in the range of 50 to 200° C. for a time sufficient to yield phenylglyoxal and the thiol reactant, and said thiol is recycled to said oxidation reaction.

10. 1-phenyl-2-phenylmercapto-1-hydroperoxyethylene.

No references cited.

DANIEL D. HORWITZ, *Primary Examiner.*